US009954329B2

(12) United States Patent
Morita (10) Patent No.: US 9,954,329 B2
(45) Date of Patent: Apr. 24, 2018

(54) COMMON PLUG FOR AC/DC AND COMMON EQUIPMENT FOR AC/DC

(71) Applicant: Sony Corporation, Tokyo (JP)

(72) Inventor: Tadashi Morita, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/329,729

(22) PCT Filed: Jul. 7, 2015

(86) PCT No.: PCT/JP2015/069554
§ 371 (c)(1),
(2) Date: Jan. 27, 2017

(87) PCT Pub. No.: WO2016/021358
PCT Pub. Date: Feb. 11, 2016

(65) Prior Publication Data
US 2017/0222380 A1 Aug. 3, 2017

(30) Foreign Application Priority Data

Aug. 5, 2014 (JP) ................... 2014-159438
Mar. 24, 2015 (JP) ................... 2015-061306

(51) Int. Cl.
*H01R 29/00* (2006.01)
*H01R 27/00* (2006.01)
(Continued)

(52) U.S. Cl.
CPC ............ *H01R 29/00* (2013.01); *H01R 13/08* (2013.01); *H01R 13/6691* (2013.01);
(Continued)

(58) Field of Classification Search
CPC ......... G06F 1/263; H01R 27/00; H01R 31/06; H01R 29/00; H01R 2103/00; H01R 35/04;
(Continued)

(56) References Cited

U.S. PATENT DOCUMENTS 3,549,861 A * 12/1970 Trachtenberg ........ A47J 41/005
215/12.1
3,838,385 A * 9/1974 Bloomingdale ....... H01R 13/44
439/135
(Continued)

FOREIGN PATENT DOCUMENTS

JP       11219750 A  *  8/1999
JP    2001-273957 A     10/2001
(Continued)

OTHER PUBLICATIONS

English Translation of JP 11219750.*
(Continued)

*Primary Examiner* — Michael A Lyons
*Assistant Examiner* — Matthew T Dzierzynski
(74) *Attorney, Agent, or Firm* — Wolf, Greenfield & Sacks, P.C.

(57) ABSTRACT

[Object] To provide a common plug for AC/DC which can easily prevent erroneous insertion into a plug receptacle.
[Solution] Provided is a common plug for AC/DC including at least one pair of connection terminals. At least one connection terminal of the at least one pair of connection terminals is able to rotate around an axis of an insertion direction into a socket so as to have a first state in a case where the connection terminal is inserted into a socket for supplying AC power and a second state in a case where the
(Continued)

connection terminal is inserted into a socket for supplying DC power, the second state being different from the first state.

12 Claims, 9 Drawing Sheets

(51) Int. Cl.
*H01R 31/06* (2006.01)
*H01R 24/28* (2011.01)
*H01R 13/66* (2006.01)
*H01R 13/08* (2006.01)
*H02M 7/06* (2006.01)
*H02M 1/42* (2007.01)
*H01R 103/00* (2006.01)

(52) U.S. Cl.
CPC .......... *H01R 24/28* (2013.01); *H02M 1/4208* (2013.01); *H02M 7/06* (2013.01); *H01R 2103/00* (2013.01)

(58) Field of Classification Search
CPC .... H01R 13/652; H01R 31/065; H01R 27/02; H01R 35/00; H01R 13/642; H01R 13/701; H01R 24/68; H02M 1/10; H02M 3/33561; Y10T 307/367; Y10T 307/664; Y10T 307/845; Y10T 307/806; Y10T 307/911
USPC ........ 439/170, 171, 172, 173, 174, 640, 956
See application file for complete search history.

(56) References Cited

U.S. PATENT DOCUMENTS

| | | | |
|---|---|---|---|
| 6,643,158 B2* | 11/2003 | McDonald | G06F 1/263 363/142 |
| 6,775,163 B2* | 8/2004 | McDonald | G06F 1/263 363/142 |
| 7,052,298 B1* | 5/2006 | Cheng | H01R 13/6675 439/103 |
| 7,303,416 B1* | 12/2007 | Liao | H01R 13/633 439/173 |
| 7,438,574 B2* | 10/2008 | Neumann | H01R 13/4532 439/172 |
| 8,043,100 B2* | 10/2011 | Liao | H01R 27/00 439/131 |
| 8,876,541 B1* | 11/2014 | Wu | H01R 27/00 439/173 |
| 9,112,315 B2* | 8/2015 | Chang | H02M 1/10 |
| 2002/0137382 A1 | 9/2002 | Shirakura et al. | |
| 2003/0103366 A1 | 6/2003 | McDonald et al. | |
| 2004/0037102 A1 | 2/2004 | McDonald et al. | |
| 2009/0284221 A1 | 11/2009 | Liao | |
| 2010/0164291 A1 | 7/2010 | Pichkur | |
| 2011/0085813 A1 | 4/2011 | Na | |
| 2014/0098584 A1 | 4/2014 | Gucyski et al. | |
| 2017/0125957 A1* | 5/2017 | Ejiri | H01R 27/00 |

FOREIGN PATENT DOCUMENTS

| | | |
|---|---|---|
| JP | 2005-507629 A | 3/2005 |
| JP | 2008-043152 A | 2/2008 |

OTHER PUBLICATIONS

Written Opinion and English translation thereof dated Sep. 15, 2015 in connection with International Application No. PCT/JP2015/069554.

International Preliminary Report on Patentability and English translation thereof dated Feb. 16, 2017 in connection with International Application No. PCT/JP2015/069554.

* cited by examiner

COMMON PLUG FOR AC/DC AND COMMON EQUIPMENT FOR AC/DC

CROSS REFERENCE TO RELATED APPLICATIONS

The present application is a U.S. National Stage Entry filed under 35 U.S.C. § 371 of International Application No. PCT/JP2015/069554 filed on Jul. 7, 2015, which claims priority to Japanese Patent Applications JP2015-061306, filed in the Japanese Patent Office on Mar. 24, 2015, and JP2014-159438, filed in the Japanese Patent Office on Aug. 5, 2014.

TECHNICAL FIELD

The present disclosure relates to a common plug for AC/DC and common equipment for AC/DC.

BACKGROUND ART

In recent years, equipment which operates by receiving supply of power from an AC power supply includes an AC power supply circuit adapting to various voltages and power supply frequencies. In such equipment including an AC power supply circuit, a power factor corrector as well as a full-wave rectifier circuit are incorporated (see, for example, Patent Literature 1).

Such equipment including an AC power supply circuit converts an AC into a DC inside and operates by receiving the DC. Therefore, equipment which includes an AC power supply circuit adapting to various voltages and power supply frequencies also operates as is by a sufficient DC voltage being applied. Accordingly, it is considered that equipment which operates by receiving supply of power from a DC power supply as well as an AC power supply will increase in the future.

CITATION LIST

Patent Literature

Patent Literature 1: JP 2008-043152A

DISCLOSURE OF INVENTION

Technical Problem

In equipment which operates by receiving supply of power from a DC power supply as well as an AC power supply, when a DC power supply plug is configured to have a structure similar to that of the DC power supply plug so that the equipment can support both AC and DC, if a plug is erroneously inserted into a socket (plug receptacle) to which power is to be supplied from an AC power supply in a state where power is received from a DC power supply, a defect such as short circuit occurs.

Therefore, the present disclosure proposes new and improved common plug for AC/DC and common equipment for AC/DC which can easily prevent erroneous insertion into a plug receptacle.

Solution to Problem

According to the present disclosure, provided is a common plug for AC/DC including at least one pair of connection terminals. At least one connection terminal of the at least one pair of connection terminals is able to rotate around an axis of an insertion direction into a socket so as to have a first state in a case where the connection terminal is inserted into a socket for supplying AC power and a second state in a case where the connection terminal is inserted into a socket for supplying DC power, the second state being different from the first state.

In addition, according to the present disclosure, provided is common equipment for AC/DC that operates with power received by the common plug for AC/DC.

Advantageous Effects of Invention

As described above, according to the present disclosure, it is possible to provide new and improved common plug for AC/DC and common equipment for AC/DC which can easily prevent erroneous insertion into a plug receptacle.

Note that the effects described above are not necessarily limitative. With or in the place of the above effects, there may be achieved any one of the effects described in this specification or other effects that may be grasped from this specification.

MODES FOR CARRYING OUT THE INVENTION

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. One embodiment of present disclosure
1.1. Background
1.2. Configuration Example
2. Conclusion
<1. One embodiment of Present Disclosure>
[1.1. Background]

Before one embodiment of the present disclosure is described in detail, first, background of one embodiment of the present disclosure will be described.

As described above, in recent years, equipment which operates by receiving supply of power from an AC power supply includes an AC power supply circuit adapting to various voltages and power supply frequencies. In such equipment including an AC power supply circuit, a power factor corrector as well as a full-wave rectifier circuit are incorporated.

Figure 1:
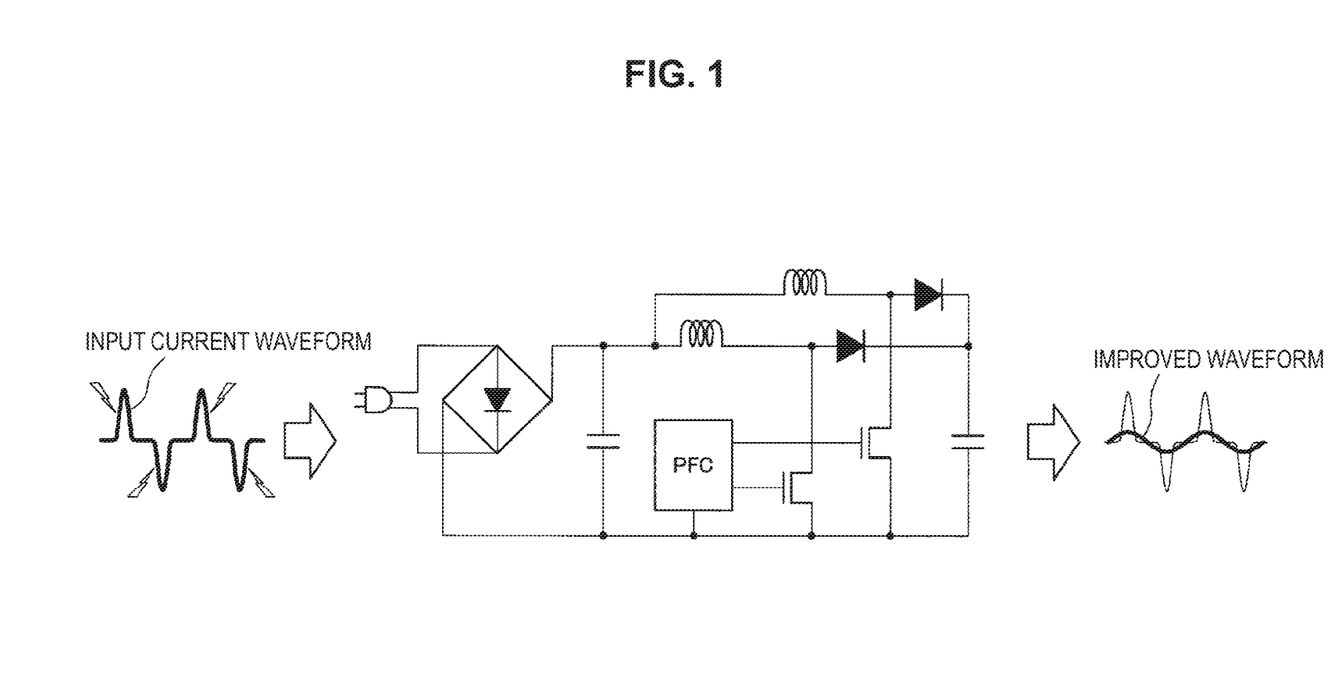
FIG. 1 is an explanatory diagram illustrating an example of a configuration and an effect of an AC power supply circuit.

FIG. 1 is an explanatory diagram illustrating an example of a configuration and an effect of an AC power supply circuit. When the AC power supply circuit does not include a power factor controller (PFC) circuit, a waveform of a current is distorted, and noise occurs due to harmonic distortion.

Therefore, by providing a PFC circuit at the AC power supply circuit, it is possible to suppress a power peak, improve a power factor, reduce unnecessary radiation and boost an input voltage of a wide range to the same internal voltage.

The equipment including the AC power supply circuit in which a full-wave rectifier circuit and a power factor corrector are incorporated operates by converting an AC into a DC inside. Therefore, the equipment including the AC power supply circuit adapting to various voltages and power supply frequencies also operates as is by a sufficient DC voltage (for example, approximately, 100 V to 230 V) being applied.

Given efficiency, it is preferable to directly supply DC power to the equipment rather than converting AC power into DC power inside the equipment. However, it is difficult to immediately switch all power supplies from AC to DC. Therefore, it is considered that equipment which operates by receiving supply of power from a DC power supply as well as from an existing AC power supply will increase in the future.

In the equipment which operates by receiving supply of power from a DC power supply as well as from an AC power supply, it is effective in terms of convenience for a user to configure a DC plug which receives DC power from the DC power supply to have a structure similar to that of an AC plug which receives AC power from the AC power supply, so that the equipment can support both AC and DC.

However, when a terminal (blade) of the DC plug is made completely the same shape as that of a terminal of the existing AC plug, if it is not possible to distinguish between DC and AC of a plug receptacle (socket) to which the plug is to be inserted, it is necessary to correctly set a state where AC can be accepted and a state where DC can be accepted at the equipment side before the plug is inserted.

At the equipment side, because it is difficult to automatically determine whether power to be supplied is AC or DC, setting at the equipment side is basically performed by a user. However, if the user erroneously performs setting or forgets the setting, and, for example, erroneously inserts the plug into the socket (plug receptacle) to which power from the AC power supply is to be supplied in a state where power is received from the DC power supply, a defect such as short circuit and disconnection of a breaker in association with the short circuit occurs.

Therefore, in view of safety aspect, the DC power supply plug preferably has a different shape from that of the AC power supply plug, and a plug receptacle to which AC is supplied preferably has an insertion hole having a different shape from that of an insertion hole of a plug receptacle to which DC is supplied.

However, although the DC power supply plug preferably has a different shape from that of the AC power supply plug, in order to prepare two types of power supply plugs by, for example, preparing adapters, it is necessary to add a removable structure to the plug or the equipment, which leads to increase in manufacturing cost. Further, there is a possibility that if the user loses the adapter, only one of the power can be received.

Therefore, it can be considered that there is a growing need for a plug supporting both AC and DC safely while having a simple configuration, and equipment including the plug in the future.

Therefore, in view of the above-described background, the present disclosure studied hard a plug supporting both AC and DC safely while having a simple configuration and equipment including the plug. As a result, as will be described below, the present disclosure achieved a plug supporting both AC and DC safely while having a simple configuration and equipment including the plug.

The background of one embodiment of the present disclosure has been described above. Subsequently, details of one embodiment of the present disclosure will be described.
[1.2. Configuration Example]

Figure 2:
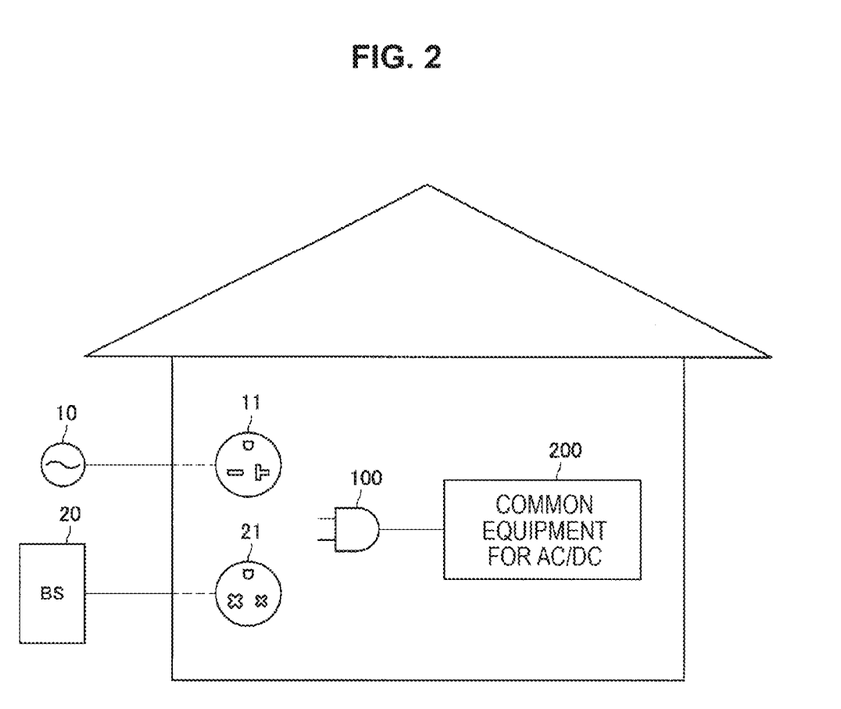
FIG. 2 is an explanatory diagram illustrating outline of one embodiment of the present disclosure.

FIG. 2 is an explanatory diagram illustrating outline of one embodiment of the present disclosure. FIG. 2 illustrates an example in the case where, at a certain power consumer, it is made possible to receive both power from an existing commercial AC power supply 10 and power from a DC power supply 20.

Note that, as an example of the DC power supply 20, a battery server including a capacitor inside may be used. This battery server can be configured to accumulate power generated by natural energy, such as, for example, a solar power system and a wind generator system. Further, this battery server can be configured to receive DC power from another battery server provided at another consumer or transmit DC power to another battery server.

As described above, in order to avoid risk due to erroneous insertion of the plug, a plug receptacle 11 for receiving AC power supplied from the AC power supply 10 has an insertion hole having a different shape from that of an insertion hole of a plug receptacle 21 for receiving DC power supplied from the DC power supply 20.

FIG. 2 illustrates common equipment for AC/DC 200 which operates either with AC or DC by the plug 100 being inserted into the plug receptacle. The common equipment for AC/DC 200 is not limited to specific equipment, and is configured to operate even when either AC power or DC power is internally supplied.

The common equipment for AC/DC 200 may include a full-wave rectifier circuit so that the equipment can operate with either DC power or AC power. Further, the common equipment for AC/DC 200 may include a PFC circuit which suppresses a power peak, improves a power factor, reduces unnecessary radiation and boosts an input voltage of a wide range to the same internal voltage so that the equipment can operate with either DC power or AC power. Still further, the common equipment for AC/DC 200 may include a DC/DC conversion circuit which can support a wide range of voltage input so that the equipment can operate either with DC power or AC power. An internal configuration example of the common equipment for AC/DC 200 will be described in detail later.

The plug 100 includes at least one pair of connection terminals. The at least one pair of connection terminals provided at the plug 100 has a first state of a state of a blade in the case where the plug is inserted into the plug receptacle 11 for supplying AC power and a second state which is different from the first state, in the case where the plug is inserted into the plug receptacle 21 for supplying DC power. The at least one pair of connection terminals provided at the plug 100 can rotate around an axis of an insertion direction into the plug receptacle.

The plug 100 may have a mechanism for notifying the common equipment for AC/DC 200 of whether the state of the blade is put into the first state or the second state. It can be considered that, in order to improve efficiency of the DC/DC conversion circuit, it is necessary to set parameters for the common equipment for AC/DC 200 in the case where AC power is input and in the case where DC power is input.

In such a case, by making it possible for the plug 100 to notify the common equipment for AC/DC 200 of whether the state is put into the first state or the second state, it is possible to notify an integrated circuit (IC) which controls the DC/DC conversion circuit of whether the plug 100 is put into the first state or the second state by the user only changing the state of the connection terminals of the plug 100.

Further, by making it possible for the plug 100 to notify the common equipment 200 for AC/DC 200 of whether the state is the first state or the second state, it is possible to notify the IC which controls the PFC circuit of whether the plug 100 is put into the first state or the second state.

As a result of the plug 100 including at least such a pair of connection terminals, risk by erroneous insertion of the plug is avoided. That is, the user needs to set the pair of connection terminals of the plug 100 in a state appropriate for the shape of the insertion hole of the plug receptacle 11 in order to insert the plug 100 into the plug receptacle 11. If the state of the pair of connection terminals of the plug 100 is put into a state for receiving DC power, the user cannot insert the plug 100 into the plug receptacle 11.

Vice versa, the user needs to set the pair of connection terminals of the plug 100 in a state appropriate for the shape of the insertion hole of the plug receptacle 21 in order to insert the plug 100 into the plug receptacle 21. If the state of the pair of connection terminals of the plug 100 is put into a state for receiving AC power, the user cannot insert the plug 100 into the plug receptacle 21.

A specific example of the plug receptacles 11 and 21, and the state of the pair of connection terminals of the plug 100 will be described.

Figure 3:
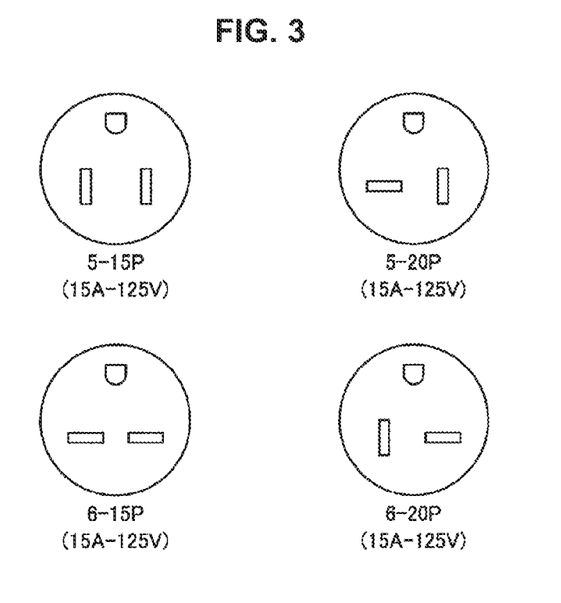
FIG. 3 is an explanatory diagram illustrating a shape of an existing flat-blade shaped plug for receiving AC power using a front view seen from a front direction.
Figure 4:
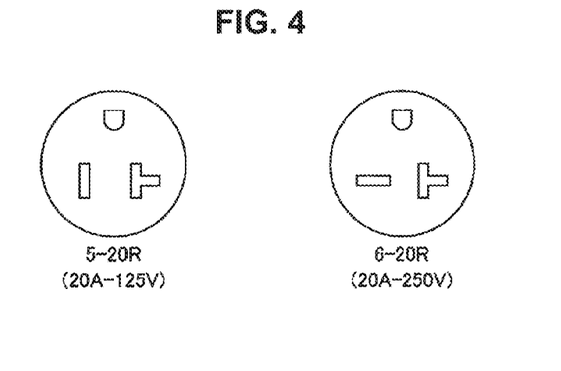
FIG. 4 is an explanatory diagram illustrating a shape of an existing plug receptacle (socket) for supplying AC power using a front view seen from a front direction.

FIG. 3 is an explanatory diagram illustrating a shape of an existing flat-blade shaped plug for receiving AC power using a front view seen from a front direction (that is, a direction seen from the plug receptacle side). Further, FIG. 4 is an explanatory diagram illustrating a shape of an existing plug receptacle (socket) for supplying AC power using a front view seen from a front direction (that is, a direction the plug is inserted).

Each of the plugs illustrated in FIG. 3 has two blades and one earth terminal. Each of the plug receptacles illustrated in FIG. 4 has insertion holes into which the two blades and the one earth terminal are to be respectively inserted.

The shape of the plug for receiving AC power is defined by various standards. For example, in national electrical manufacturers association (NEMA) standards in the US, the shape of the blade of the plug differs according to combination of a rated current and a rated voltage.

FIG. 3 illustrates a 5-15P type plug for a rated current of 15 A and a rated voltage of 125 V, a 5-20P type plug for a rated current of 20 A and a rated voltage of 125 V, a 6-15P type plug for a rated current of 15 A and a rated voltage of 250 V, and a 6-20P type plug for a rated current of 20 A and a rated voltage of 250 V.

In a similar manner, the shape of the plug receptacle for supplying AC power is defined by various standards. For example, in the NEMA standards in the US, the shapes of insertion holes of the two blades of the plug differ according to combination of a rated current and a rated voltage. FIG. 4 illustrates a 5-20R type plug receptacle for a rated current of 20 A and a rated voltage of 125 V, and a 6-20R type plug receptacle for a rated current of 20 A and a rated voltage of 250 V.

The shapes of at least two blades and insertion holes into which the two blades are inserted of the plug for receiving DC power and the plug receptacle for supplying DC power are preferably different from those of the existing flat-blade shaped plug for receiving AC power and the plug receptacle for supplying AC power as described above. Possible examples of the plug and the plug receptacle for supplying DC power will be described below.

Figure 5:
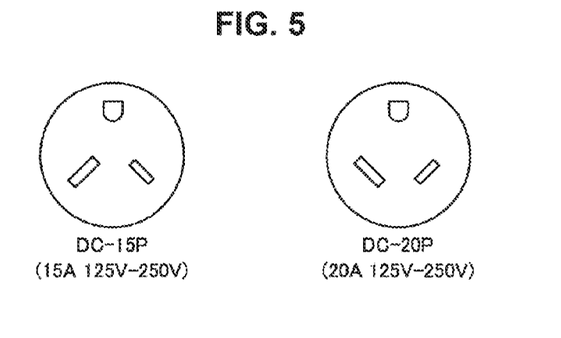
FIG. 5 is an explanatory diagram illustrating an example of a shape of a flat-blade shaped plug for receiving DC power using a front view seen from a front direction.

FIG. 5 is an explanatory diagram illustrating one example of the shape of the flat-blade shaped plug for receiving DC power using a front view seen from a front direction (that is, a direction seen from the plug receptacle side). Further, FIG. 6 is an explanatory diagram illustrating the shape of the plug receptacle (socket) for supplying DC power using a front view seen from a front direction (that is, a direction the plug is inserted).

As illustrated in FIG. 3, the existing flat-blade shaped plug for receiving AC power is directed in a vertical or horizontal direction. Therefore, the direction of the blade of the flat-blade shaped plug for receiving DC power is preferably a direction other than horizontal and vertical directions, for example, an oblique direction as illustrated in, for example, FIG. 5. FIG. 5 illustrates an example of the plug for a rated current of 15 A and a rated voltage of 125 V to 250 V, and an example of the plug for a rated current of 20 A and a rated voltage of 125 V to 250 V.

Figure 6:
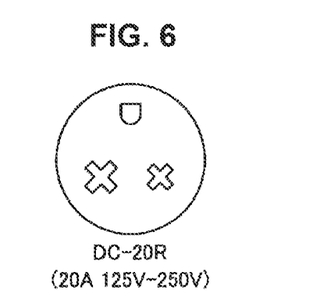
FIG. 6 is an explanatory diagram illustrating a shape of a plug receptacle (socket) for supplying DC power using a front view seen from a front direction.

As illustrated in FIG. 6, the plug receptacle 21 which supplies DC power has insertion holes into which the plugs illustrated in FIG. 5 can be inserted. The plug receptacle 21 illustrated in FIG. 6 is configured to be able to output DC power of a rated current of 20 A and a rated voltage of 125 V to 250 V to the plug. Further, the plug receptacle 21 has insertion holes having a cross shape as illustrated in FIG. 6 so that both two types of plugs illustrated in FIG. 5 can be inserted into the insertion holes.

In order to support both the existing plug receptacle which supplies AC power as illustrated in FIG. 4 and the plug receptacle 21 which supplies DC power as illustrated in FIG. 6, the plug 100 according to one embodiment of the present disclosure can be put into at least two blade states of the first state and the second state.

Figure 7:
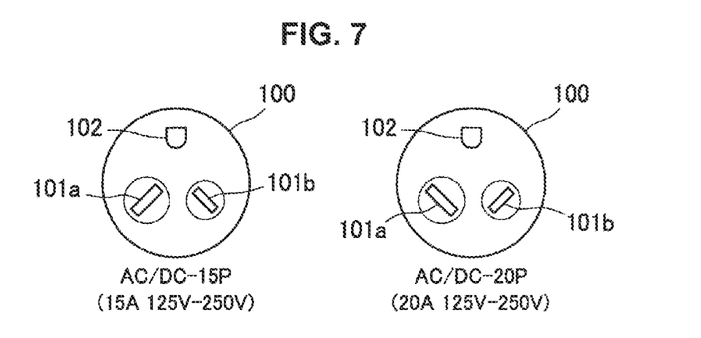
FIG. 7 is an explanatory diagram illustrating a shape of a plug 100 according to one embodiment of the present disclosure using a front view seen from a front direction.

FIG. 7 is an explanatory diagram illustrating the shape of the plug 100 according to one embodiment of the present disclosure using a front view seen from a front direction (that is, a direction seen from the plug receptacle side). The plug 100 according to one embodiment of the present disclosure has two blades 101a and 101b which are one example of one pair of connection terminals, and an earth terminal 102.

The blades 101a and 101b are provided at the plug 100 so as to be able to rotate around an axis of an insertion direction into the plug receptacle. Because the blades 101a and 101b can rotate around an axis of the insertion direction into the plug receptacle, the plug 100 can be put into two states as illustrated in FIG. 7.

Note that a rotary switch for detecting whether the state of the blades 101a and 101b is the first state or the second state may be provided at the plug 100. The rotary switch will be described in detail later.

Note that the range of an angle of rotation of the blades 101a and 101b may be restricted so that the blades can be put into only the two states as illustrated in FIG. 7.

Because the blades 101a and 101b are provided so as to be able to rotate around an axis of an insertion direction into the plug receptacle, the plug 100 according to one embodiment of the present disclosure can be inserted into both the existing plug receptacle for supplying AC power illustrated in FIG. 4 and the plug receptacle for supplying DC power illustrated in FIG. 6.

Figure 8:
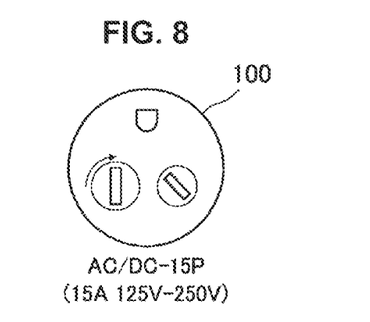
FIG. 8 is an explanatory diagram illustrating an example of a state of blades 101a and 101b.
Figure 9:
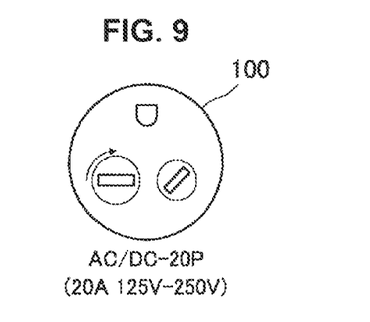
FIG. 9 is an explanatory diagram illustrating an example of a state of the blades 101a and 101b.

FIG. 8 and FIG. 9 are explanatory diagrams illustrating examples of the state of the blades 101a and 101b. The user who uses equipment including the plug 100 according to one embodiment of the present disclosure can insert the plug 100 into both the existing plug receptacle for supplying AC power and the plug receptacle for supplying DC power illustrated in FIG. 6 by rotating the blades 101a and 101b around an axis of an insertion direction into the plug receptacle as illustrated in, for example, FIG. 8 and FIG. 9.

The blades 101a and 101b may be configured such that, upon rotation of the blades, if one blade is rotated, the other blade rotates in conjunction with the rotation of the one blade. In this event, the rotation direction of the blade rotating in conjunction with the rotation may be defined according to a rated current.

As illustrated in FIG. 3, while the directions of the blades are parallel to each other in the AC plug for a rated current of 15 A, the directions of the blades are perpendicular to each other in the AC plug for a rated current of 20 A. If the blades 101a and 101b of the plug 100 according to one embodiment of the present disclosure are configured to be able to freely rotate, for example, when the rated current of the common equipment for AC/DC 200 is defined at 15 A, there is a possibility that the user sets the directions of the blades 101a and 101b at the same directions as those of the AC plug for a rated current of 20 A.

If the plug 100 in which the directions of the blades 101a and 101b are set at the same directions as those of the AC plug for a rated current of 20 A by the user is inserted into the plug receptacle which supplies AC power for a rated current of 20 A, a rated current equal to or higher than the rated current of the common equipment for AC/DC 200 flows, which may lead to a failure of the equipment.

Therefore, when one of the blades 101a and 101b is rotated and the other rotates in conjunction with the rotation of the one blade, the rotation direction of the blade rotating in conjunction with the rotation may be determined according to a rated current. That is, the blades 101a and 101b may be provided at the plug 100 such that, when the rated current is 15 A, the blades can rotate in opposite directions, and, when the rated current is 20 A, the blades can rotate in the same direction.

The specific example of the shape of the plug 100 according to one embodiment of the present disclosure has been described above. Subsequently, a functional configuration example of the common equipment for AC/DC 200 including the plug 100 according to one embodiment of the present disclosure will be described.

Figure 10:
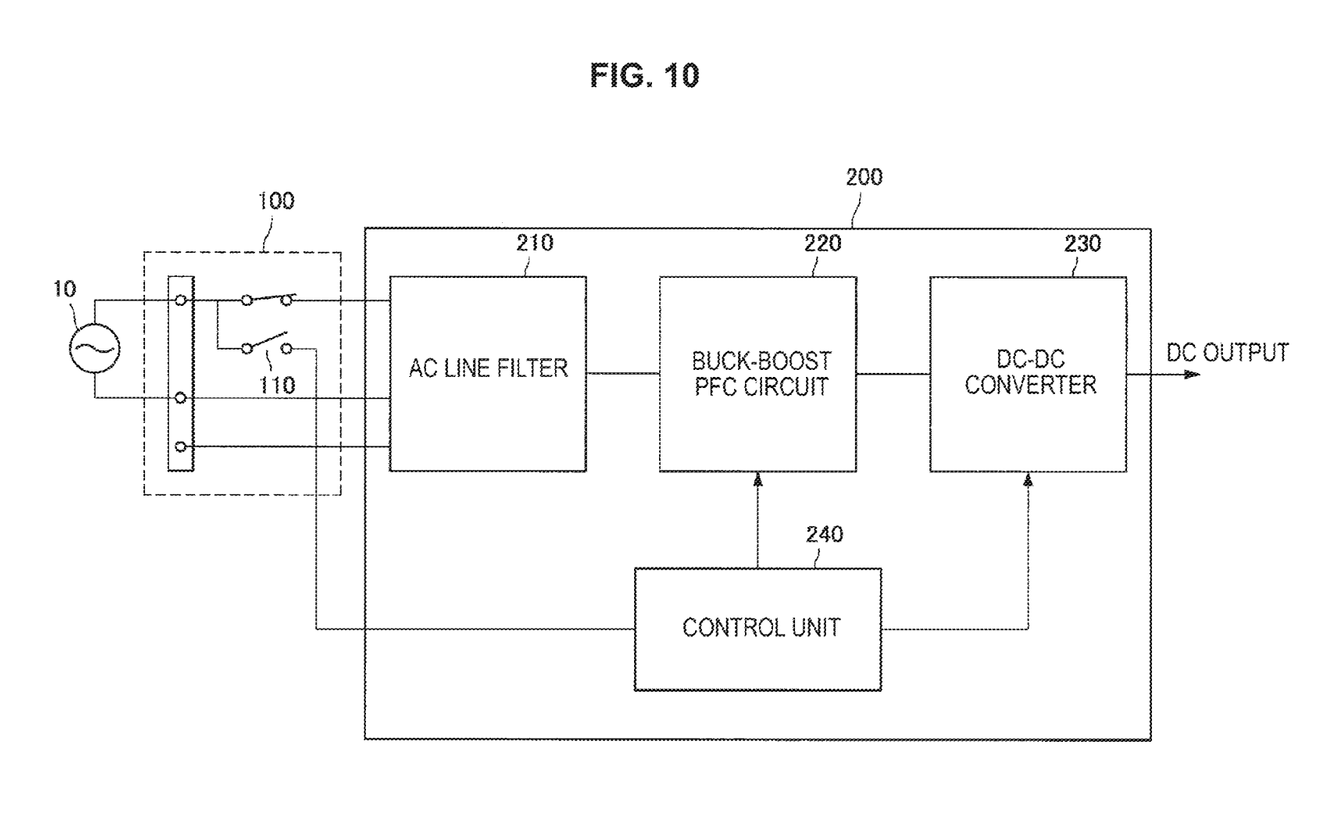
FIG. 10 is an explanatory diagram illustrating a functional configuration example of common equipment for AC/DC 200 according to one embodiment of the present disclosure.

FIG. 10 is an explanatory diagram illustrating the functional configuration example of the common equipment for AC/DC 200 according to one embodiment of the present disclosure. FIG. 10 illustrates the functional configuration example of the common equipment for AC/DC 200 which operates by receiving either AC power or DC power from the plug 100. Note that FIG. 10 illustrates a state where the common equipment for AC/DC 200 receives AC power from the AC power supply 10. The functional configuration example of the common equipment for AC/DC 200 according to one embodiment of the present disclosure will be described below using FIG. 10.

As illustrated in FIG. 10, the common equipment for AC/DC 200 according to one embodiment of the present disclosure includes an AC line filter 210, a boost PFC circuit 220, a DC-DC converter 230 and a control unit 240.

The AC line filter 210 is a filter which removes noise which can be generated at a power line inside the common equipment for AC/DC 200. As the AC line filter 210, for example, a filter for common mode noise using a capacitor and a coil can be used.

Note that, while not illustrated in FIG. 10, in the common equipment for AC/DC 200, a full-wave rectifier circuit is provided in a subsequent stage of the AC line filter 210, so that DC power is supplied to the boost PFC circuit 220.

The boost PFC circuit 220 is a circuit for improving a power factor of a power supply, and, in the present embodiment, a boost PFC circuit of a continuous conduction mode is used. The boost PFC circuit 220 can be configured with an inductor (booster coil), a diode, a switching element such as a metal oxide semiconductor field effect transistor (MOSFET) and an insulated gate bipolar transistor (IGBT), a smoothing capacitor, or the like.

Further, in the present embodiment, the boost PFC circuit 220 changes conversion efficiency of a power factor between the case where AC power is supplied and the case where DC power is supplied by an instruction from the control unit 240 which will be described later. Note that a smoothing circuit which converts a DC waveform of power converted by the full-wave rectifier circuit into a smooth waveform can be provided at the boost PFC circuit 220.

For example, the boost PFC circuit 220 improves a power factor of the power supply by providing a switching element such as a MOSFET. By ON/OFF control of the switching element such as an MOSFET being changed by the control unit 240, the boost PFC circuit 220 can change the conversion efficiency of the power factor between the case where AC power is supplied and the case where DC power is supplied.

The DC-DC converter 230 converts the DC power output from the boost PFC circuit 220 into a voltage appropriate for operation of the common equipment for AC/DC 200. In the present embodiment, as the DC-DC converter 230, for example, a forward type insulated DC-DC converter is used.

Further, in the present embodiment, the DC-DC converter 230 changes voltage conversion operation between the case where AC power is supplied and the case where DC power is supplied by an instruction from the control unit 240 which will be described later. In the DC-DC converter 230, for example, parameter setting is changed by the control unit 240 between the case where AC power is input and the case where DC power is input.

The DC-DC converter 230 includes a switching element such as an MOSFET, and converts a voltage through switching operation of the switching element. By ON/OFF control of the switching element such as an MOSFET being changed by the control unit 240, the DC-DC converter 230 can change the voltage conversion operation between the case where AC power is supplied and the case where DC power is supplied.

The control unit 240 controls the boost PFC circuit 220 and the DC-DC converter 230. A switching signal is output according to ON/OFF of the rotary switch 110 which is provided at the plug 100 and which is one example of a signal output unit of the present disclosure. The control unit 240 can detect whether the state of the blades 101a and 101b of the plug 100 is the first state in the case where the plug is inserted into the plug receptacle which supplies AC power and the second state in the case where the plug is inserted into the plug receptacle which supplies DC power by the switching signal output according to ON/OFF of the rotary switch 110.

Figure 11:
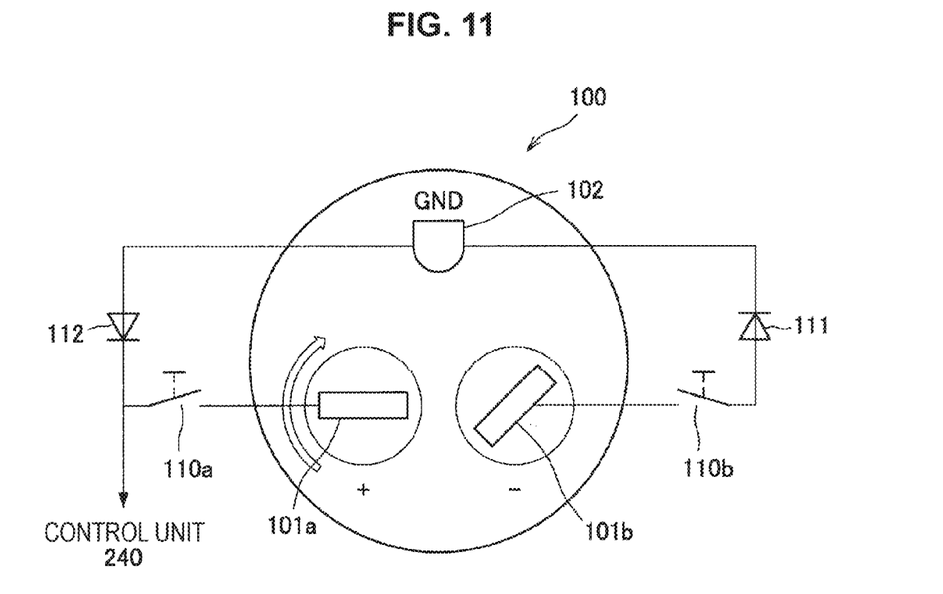
FIG. 11 is an explanatory diagram illustrating an example of a rotary switch provided at the plug 100 according to one embodiment of the present disclosure.

FIG. 11 is an explanatory diagram illustrating an example of the rotary switch provided at the plug 100 according to one embodiment of the present disclosure.

Figure 12:
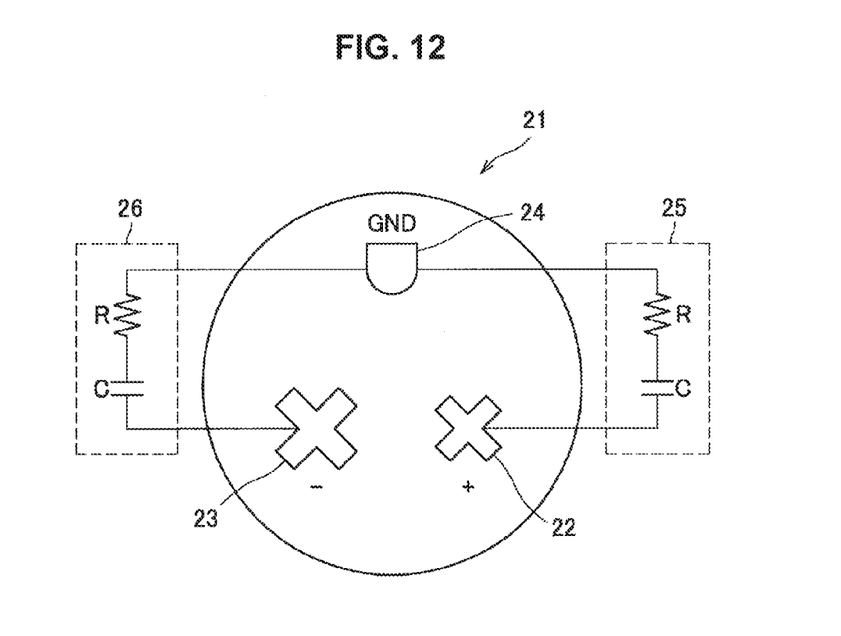
FIG. 12 is an explanatory diagram illustrating an example of a plug receptacle 21 into which the plug 100 is inserted.

Further, FIG. 12 is an explanatory diagram illustrating an example of the plug receptacle 21 into which the plug 100 is inserted. FIG. 11 illustrates a rotary switch 110a provided so as to correspond to the blade 101a, and a rotary switch 110b provided so as to correspond to the blade 101b. Further, FIG. 11 also illustrates diodes 111 and 112 which prevent countercurrent. The blade 101b is connected to the earth terminal 102 through the diode 111, and the earth terminal 102 is connected to the blade 101a through the diode 112.

In the plug 100 illustrated in FIG. 11, when the blades 101a and 101b are put into the second state, the rotary switches 110a and 110b are turned on, and a current flows to the control unit 240. The control unit 240 can detect that the blades 101a and 101b of the plug 100 are put into the second state through generation of a current by the rotary switches 110a and 110b being turned on.

Further, at the plug receptacle 21 illustrated in FIG. 12, snubber circuits 25 and 26 which are configured with a resistance and a capacitor are illustrated between an electrode (which is not illustrated) provided at the insertion holes 22 and 23 into which the blades 101a and 101b are inserted and an electrode (which is not illustrated) provided at the insertion hole 24 into which the earth terminal 102 is inserted. The snubber circuits 25 and 26 suppress arc discharge when the plug 100 is pulled out from the plug receptacle 21.

Figure 13:
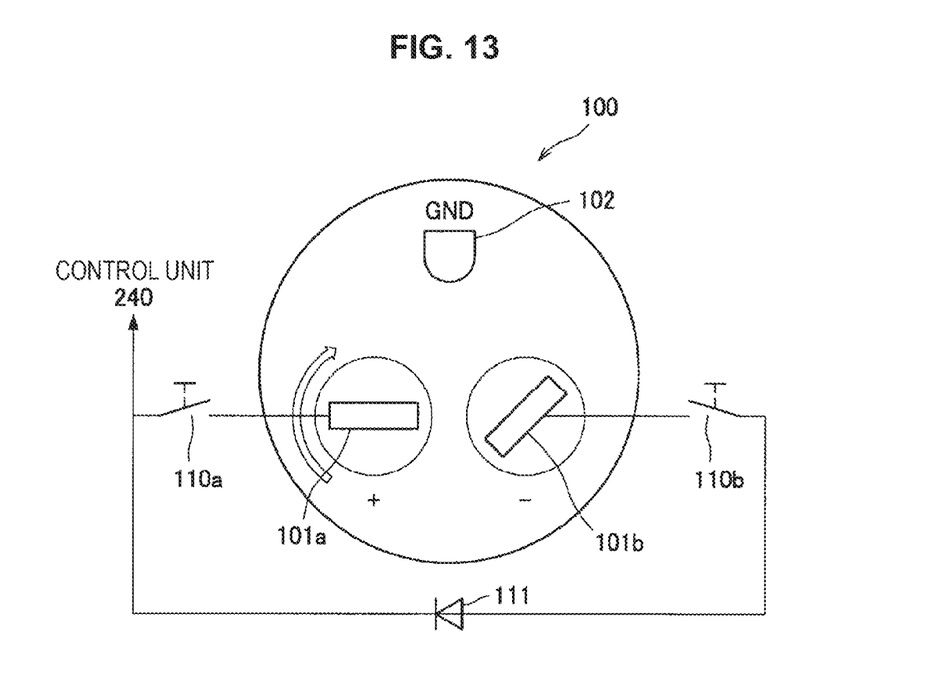
FIG. 13 is an explanatory diagram illustrating another example of the rotary switch provided at the plug 100 according to one embodiment of the present disclosure.

FIG. 13 is an explanatory diagram illustrating another example of the rotary switches provided at the plug 100 according to one embodiment of the present disclosure. FIG. 13 illustrates an example where the blades 101a and 101b are connected without being through the earth terminal 102.

Also at the plug 100 illustrated in FIG. 13, when the blades 101a and 101b are put into the second state, the rotary switches 110a and 110b are turned on, and a current flows to the control unit 240. The control unit 240 can detect that the blades 101a and 101b of the plug 100 are put into the second state through generation of a current by the rotary switches 110a and 110b being turned on.

Figure 14:
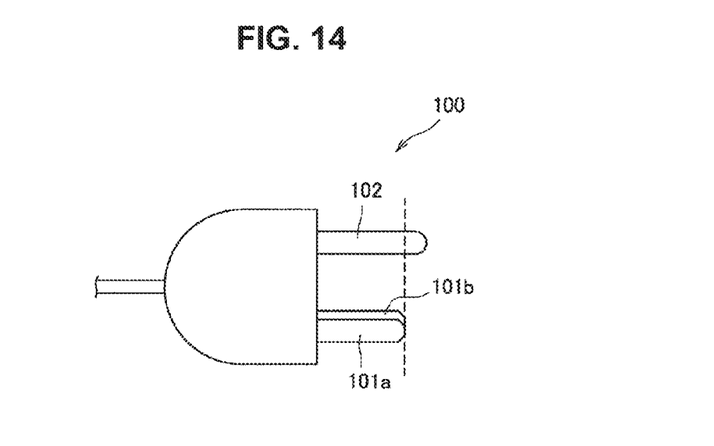
FIG. 14 is an explanatory diagram illustrating a side view of the plug 100 seen from a left side according to one embodiment of the present disclosure.

FIG. 14 is an explanatory diagram illustrating a side view of the plug 100 seen from a left side according to one embodiment of the present disclosure. As illustrated in FIG. 14, the plug 100 according to one embodiment of the present disclosure is configured such that the earth terminal 102 is longer than the blades 101a and 101b. By configuring the plug 100 such that the earth terminal 102 is longer than the blades 101a and 101b, it is possible to improve safety when the plug is inserted into and pulled out from the plug receptacle 11 for receiving AC power and the plug receptacle 21 for receiving DC power.

Figure 15:
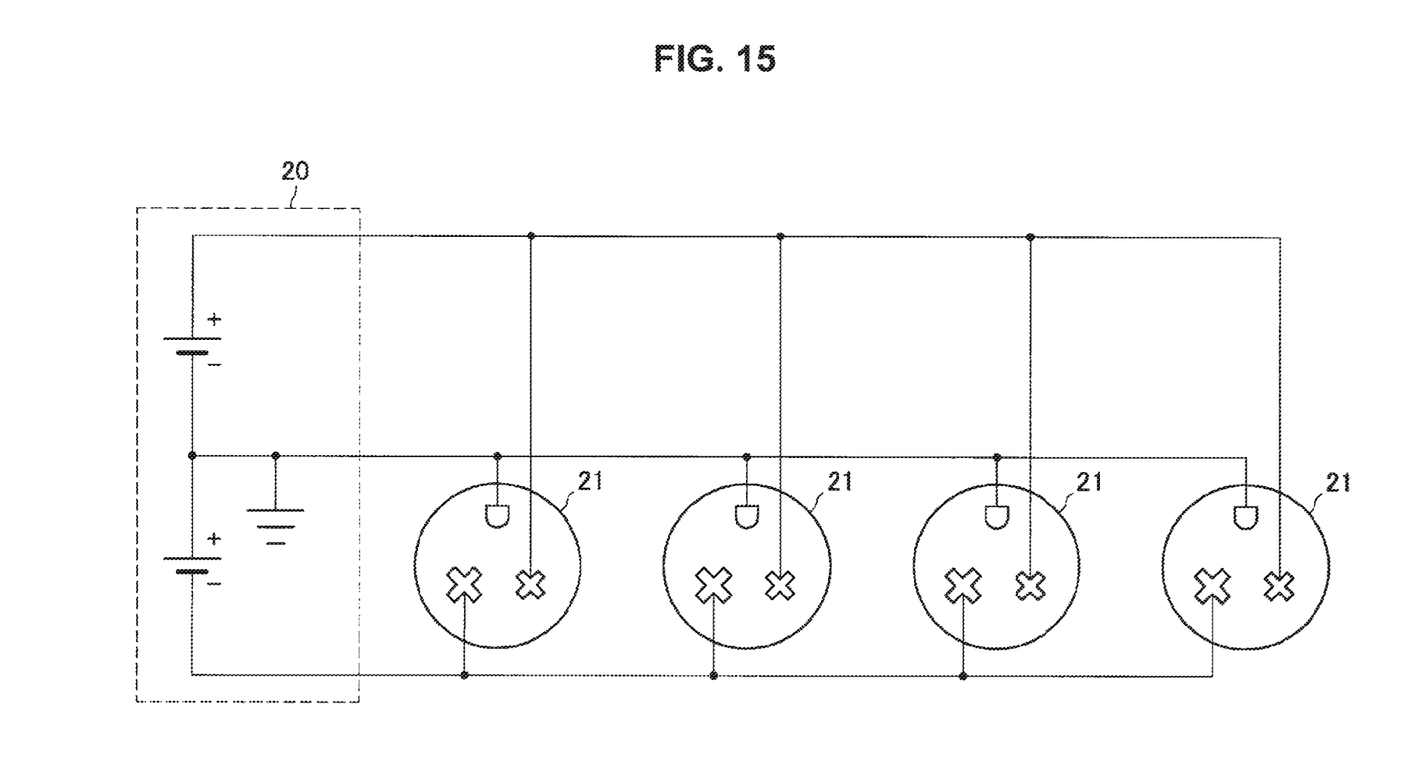
FIG. 15 is an explanatory diagram illustrating a connection example in the case where the plug receptacle 21 is connected to a power line to which DC power is supplied.

FIG. 15 is an explanatory diagram illustrating a connection example in the case where the plug receptacle 21 is connected to a power line to which DC power is supplied. FIG. 15 illustrates a connection example in the case where the plug receptacle 21 is connected to a positive line, a negative line and a neutral line when DC power is supplied with three lines of the positive line, the negative line and the neutral line. Note that, while FIG. 15 illustrates a battery server 20 as a supply source of DC power, it goes without saying that the supply source of the DC power is not limited to the battery server 20.

Figure 16:
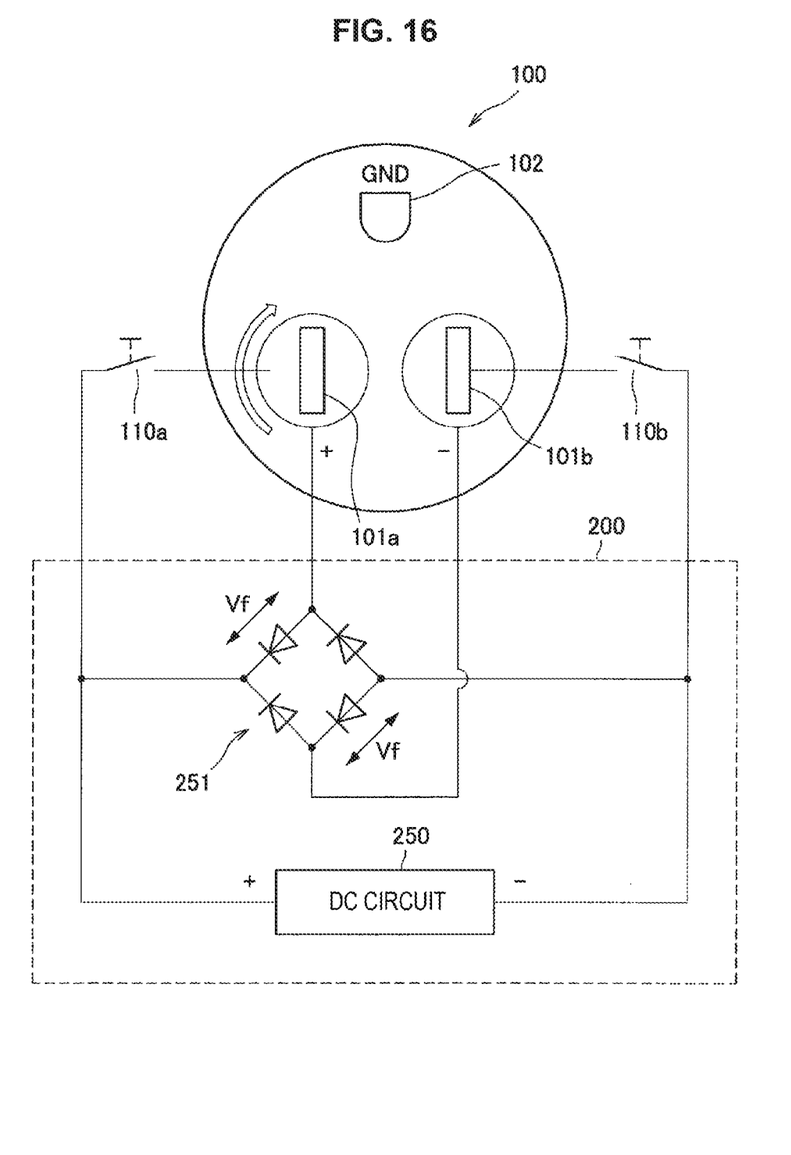
FIG. 16 is an explanatory diagram illustrating a modified example of the common equipment for AC/DC 200 including the plug 100.

FIG. 16 is an explanatory diagram illustrating a modified example of the common equipment for AC/DC 200 including the plug 100. FIG. 16 illustrates an example where a DC circuit 250 which operates by receiving supply of DC power and a diode bridge 251 are provided at the common equipment for AC/DC 200.

When the plug 100 is switched from AC to DC, the rotary switches 110a and 110b are turned on by rotation of the blades 101a and 101b, and the blades 101a and 101b are electrically respectively connected to a cathode and an anode of the diode bridge 251 by the rotary switches 110a and 110b being turned on.

By the blades 101a and 101b being electrically respectively connected to the cathode and the anode of the diode bridge 251, it is possible to bypass a voltage drop Vf of the diode occurring when AC is rectified. Because the voltage drop Vf of the diode occurring when AC is rectified can be bypassed, the common equipment for AC/DC 200 illustrated in FIG. 16 can suppress decrease in power efficiency when DC power is received.

Note that, as illustrated in FIG. 16, the diode bridge 251 to be electrically connected to the blades 101a and 101b according to the state of the rotary switches 110a and 110b may be provided at the common equipment for AC/DC 200 illustrated in, for example, FIG. 10.

<2. Conclusion>

As described above, according to one embodiment of the present disclosure, the plug 100 which supports both AC and DC safely with a simple configuration and the common equipment for AC/DC 200 including the plug 100 are provided.

At the plug 100 according to one embodiment of the present disclosure, the blades 101a and 101b are provided so as to be able to rotate around an axis of an insertion direction into the plug receptacle. By providing the blades 101a and 101b in this manner, the plug 100 according to one embodiment of the present disclosure can be inserted into both the existing plug receptacle for supplying AC power and the plug receptacle for supplying DC power.

The user who uses the common equipment for AC/DC 200 including the plug 100 according to one embodiment of the present disclosure can insert the plug 100 into both the existing plug receptacle for supplying AC power and the plug receptacle for supplying DC power by rotating the blades 101a and 101b around an axis of an insertion direction into the plug receptacle.

Further, because the common equipment for AC/DC 200 including the plug 100 according to one embodiment of the present disclosure acquires a signal indicating whether the state of the blades is a state for receiving AC power or a state for receiving DC power from the plug 100, it is possible to control operation of circuits provided inside, for example, the boost PFC circuit 220 and the DC-DC converter 230 according to the type of power.

Note that, while in the above-described embodiment, the blades 101a and 101b of the plug 100 are configured to be able to rotate so as to switch the state between the first state and the second state, the present disclosure is not limited to this example. For example, it is also possible to switch the state between the first state and the second state by sliding one pair of blades provided at the plug 100 in a horizontal direction.

Further, while, in the above-described embodiment, the blades 101a and 101b are configured to be able to rotate around an axis of an insertion direction into the plug receptacle so as to switch the state between the first state and the second state, the rotation axis of the blades 101a and 101b may be provided on the blades 101a and 101b or provided at a position displaced from the position on the blades 101a and 101b by a predetermined amount.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)
A common plug for AC/DC including:
at least one pair of connection terminals,
wherein at least one connection terminal of the at least one pair of connection terminals is able to rotate around an axis of an insertion direction into a socket so as to have a first state in a case where the connection terminal is inserted into a socket for supplying AC power and a second state in a case where the connection terminal is inserted into a socket for supplying DC power, the second state being different from the first state.

(2)
The common plug for AC/DC according to (1),
wherein the at least one pair of connection terminals changes an angle with respect to a direction orthogonal to the insertion direction into the plug receptacle between the first state and the second state.

(3)
The common plug for AC/DC according to (1) or (2),
wherein the at least one pair of connection terminals is able to rotate within a restricted angular range.

(4)
The common plug for AC/DC according to any of (1) to (3),
wherein the axis of the at least one connection terminal is provided on the connection terminal.

(5)
The common plug for AC/DC according to (1),
wherein the axis of the at least one connection terminal is provided while being displaced from the connection terminal.

(6)
The common plug for AC/DC according to any of (1) to (5), including: a signal output unit configured to output a switching signal when the at least one pair of connection terminals are put into the second state.

(7)
The common plug for AC/DC according to any of (1) to (6),
wherein, when one connection terminal out of the at least one pair of connection terminals rotates, the other connection terminal is able to rotate in the same direction as the rotation direction of the one connection terminal.

(8)
The common plug for AC/DC according to (1) to (7),
wherein, when one connection terminal out of the at least one pair of connection terminals rotates, the other connection terminal is able to rotate in an opposite direction from the rotation direction of the one connection terminal.

(9)
Common equipment for AC/DC that operates with power received by the common plug for AC/DC according to claim 1.

(10)
The common equipment for AC/DC according to (9), including: a signal output unit configured to output a switching signal when the at least one pair of connection terminals are put into the second state.

(11)
The common equipment for AC/DC according to (10), further including: a power conversion control unit configured to change conversion efficiency of power between a case where DC power is received and a case where AC power is received, according to presence or absence of the switching signal.

(12)
The common equipment for AC/DC according to any of (9) to (11), further including:
a diode bridge configured to rectify AC,
wherein, when DC power is received, an anode of the diode bridge is electrically connected to a connection terminal which becomes a negative side out of the pair of connection terminals, and a cathode of the diode bridge is electrically connected to a connection terminal which becomes a positive side out of the pair of connection terminals.

REFERENCE SIGNS LIST

10 AC power supply
11 plug receptacle
20 DC power supply
21 plug receptacle 22, 23, 24 insertion hole
25, 26 snubber circuit
100 plug
101a, 101b blade
102 earth terminal
110, 110a, 110b rotary switch
111, 112 diode
200 common equipment for AC/DC

The invention claimed is:

1. A plug for AC/DC comprising:
at least one pair of connection terminals,
wherein at least one connection terminal of the at least one pair of connection terminals is configured to rotate around an insertion direction into a socket so as to have a first state in a case where the connection terminal is inserted into a socket for supplying AC power and a second state in a case where the connection terminal is inserted into a socket for supplying DC power, the second state being different from the first state.

2. The plug for AC/DC according to claim 1,
wherein the at least one pair of connection terminals changes an angle with respect to a direction orthogonal to the insertion direction into the plug receptacle between the first state and the second state.

3. The plug for AC/DC according to claim 1,
wherein the at least one pair of connection terminals is able to rotate within a restricted angular range.

4. The plug for AC/DC according to claim 1,
wherein the axis of the at least one connection terminal is provided on the connection terminal.

5. The plug for AC/DC according to claim 1,
wherein the axis of the at least one connection terminal is provided while being displaced from the connection terminal.

6. The plug for AC/DC according to claim 1, comprising:
a signal output unit configured to output a switching signal when the at least one pair of connection terminals are put into the second state.

7. The plug for AC/DC according to claim 1,
wherein, when one connection terminal out of the at least one pair of connection terminals rotates, the other connection terminal is able to rotate in the same direction as the rotation direction of the one connection terminal.

8. The plug for AC/DC according to claim 1,
wherein, when one connection terminal out of the at least one pair of connection terminals rotates, the other connection terminal is able to rotate in an opposite direction from the rotation direction of the one connection terminal.

9. Equipment for AC/DC that operates with power received by the plug for AC/DC according to claim 1.

10. The equipment for AC/DC according to claim 9, comprising:
a signal output unit configured to output a switching signal when the at least one pair of connection terminals are put into the second state.

11. The equipment for AC/DC according to claim 10, further comprising:
a power conversion control unit configured to change conversion efficiency of power between a case where DC power is received and a case where AC power is received, according to presence or absence of the switching signal.

12. The equipment for AC/DC according to claim 9, further comprising:
a diode bridge configured to rectify AC,
wherein, when DC power is received, an anode of the diode bridge is electrically connected to a connection terminal which becomes a negative side out of the pair of connection terminals, and a cathode of the diode bridge is electrically connected to a connection terminal which becomes a positive side out of the pair of connection terminals.

* * * * *